United States Patent [19]
Kates et al.

[11] Patent Number: 6,108,215
[45] Date of Patent: Aug. 22, 2000

[54] VOLTAGE REGULATOR WITH DOUBLE SYNCHRONOUS BRIDGE CCFL INVERTER

[75] Inventors: Barry K. Kates, Austin; John Cummings, Round Rock, both of Tex.

[73] Assignee: Dell Computer Corporation, Round Rock, Tex.

[21] Appl. No.: 09/236,131

[22] Filed: Jan. 22, 1999

[51] Int. Cl.[7] .................................................. H02M 3/335
[52] U.S. Cl. ............................. 363/17; 363/41; 363/132
[58] Field of Search ................................. 363/16, 17, 22, 363/24, 132, 41

[56] References Cited

U.S. PATENT DOCUMENTS

| | | | |
|---|---|---|---|
| 4,887,007 | 12/1989 | Almering et al. | 315/243 |
| 5,416,387 | 5/1995 | Cuk et al. | 315/209 R |
| 5,430,641 | 7/1995 | Kates | 363/133 |
| 5,568,041 | 10/1996 | Hesterman | 323/207 |
| 5,930,121 | 7/1999 | Henry | 363/16 |
| 5,982,161 | 11/1999 | Nguyen et al. | 323/284 |

OTHER PUBLICATIONS

Mark Jordan, et al., Unitrode Application Notes, "Resonant Fluorescent Lamp Converter Provides Efficient and Compact Solution," pp. 3–370 to 3–376, Fig. 10 to Fig. 15. "No Date".

J. O'Connor, Unitrode Application Notes, Dimmable Cold-–Cathode Fluorescent Lamp Ballast Design Using the UC 3871, pp. 1 to 15. "No Date".

Unitrode Application Notes, "Resonant Fluorescent Lamp Driver," pp. 1 to 5. Oct. 1994.

*Primary Examiner*—Adolf Deneke Berhane
*Attorney, Agent, or Firm*—Skjerven, Morrill, MacPherson, Franklin, & Friel, L.L.P.; Stephen A. Terrile; Mary Jo Bertani

[57] ABSTRACT

An inverter circuit having dual converters for driving a fluorescent lamp comprising a pulse width modulator coupled to receive a feedback signal indicative of current in the fluorescent lamp. The pulse width modulator generates driving signals that are received by a synchronously switching voltage regulator having a high side driver and a low side driver. A self-resonant converter is coupled between the synchronously switching voltage regulator and the fluorescent lamp and generates a voltage signal for illuminating the fluorescent lamp. The self-resonant converter includes a transformer having a primary winding and at least one secondary winding, a capacitor coupled in parallel with the primary winding, and a full bridge circuit. The full bridge circuit may include four switching transistors, such as MOSFETs coupled in an H-configuration to the primary winding and the capacitor. A zero voltage detector controls switching of the synchronously switching voltage regulator based on voltage input to the self-resonant converter. A timer circuit is coupled to the self-resonant converter and the zero voltage detector, and outputs signals to control the frequency of oscillation in the self-resonant converter based on the signals from the self-resonant converter and the zero voltage detector.

26 Claims, 11 Drawing Sheets

VOLTAGE REGULATOR WITH DOUBLE SYNCHRONOUS BRIDGE CCFL INVERTER

BACKGROUND OF THE INVENTION

1. Field of the Invention

This invention relates to the field of power supplies for portable computer systems, and more particularly, to an inverter circuit with dual converters including a synchronously switching voltage regulator and a self-resonant oscillator for supplying power to cold cathode fluorescent lamps.

2. Description of the Related Art

Liquid crystal displays with cold cathode fluorescent lamp (CCFL) back lighting are widely used laptop computer displays. Circuits for supplying power to CCFLs require a controllable alternating current power supply and a feedback loop to accurately monitor the current in the lamp in order to maintain operating stability of the circuit and to have an ability to vary the lamp brightness. Such circuits must be able to generate a high voltage to turn on the fluorescent lamp and then lower the voltage when current begins to flow in the lamp.

Inverter circuits convert unregulated DC voltage to regulated AC current and typically include a switching regulator, which are classified into different configurations or "topologies." One such topology is the single-ended inductor circuit, consisting of relatively simple circuits where a switch determines whether the voltage applied to an inductor is the input voltage, $V_{dc}$, or zero. In this manner, the output voltage is a function of the average voltage applied to the inductor. The switch may be implemented using various electronic components, for example, a power transistor, coupled either in series or parallel with the load. The regulator controls the turning ON and turning OFF of the switch in order to regulate the flow of power to the load. The switching regulator employs inductive energy storage elements to convert the switched current pulses to a steady load current. Power in a switching regulator is thus transmitted across the switch in discrete current pulses.

In order to generate a stream of current pulses, switching regulators typically include control circuitry to turn the switch on and off. The switch duty cycle, which controls the flow of power to the load, can be varied by a variety of methods. For example, the duty cycle can be varied by either (1) fixing the pulse stream frequency and varying the ON or OFF time of each pulse, or (2) fixing the ON or OFF time of each pulse and varying the pulse stream frequency. Which ever method is used to control the duty cycle, the switch in switching regulators is either OFF, where no power is dissipated by the switch, or ON in a low impedance state, where a small amount of power is dissipated by the switch. This generally results in fairly efficient operation with regard to the average amount of power dissipated.

One method that has been utilized to improve operational efficiency of voltage regulators employs synchronous rectification. In synchronous rectification, a pair of switches, which are connected in series between the input voltage and ground, are synchronized so that either the input voltage or ground is applied to the input of an inductor. The synchronous control of the switches provides improved efficiency compared to traditional circuits which employed a switch and a diode.

In the prior art, the output of the voltage regulator is used to drive one or more lamps for illuminating the display. A transformer converts the input from the voltage regulator to a current signal having the frequency and magnitude required to drive the lamp. It is desirable to reduce the size of the transformers currently used in display assemblies while providing the same or greater power to the lamp. It is also desirable to provide an inverter circuit that dissipates less heat, which can cause spotting, discoloration, and poor color purity of the display.

Energy loss due to various parasitic paths typically occurs in display assemblies. For example, energy is lost in the wire that connects the secondary winding of the transformer to the first end of lamp, while parasitic capacitance losses cause lost energy in the lamp itself. Incremental energy losses accumulate over the length of the lamp starting at the grounded end, reaching a maximum value at the non-grounded end. Another source of parasitic loss is due to electrical interference with light reflector in a display assembly, which is typically constructed of metallic material. It is therefore desirable to provide an inverter circuit that provides the same or greater power to one or more lamps while reducing the parasitic energy loss.

The inverter circuit is typically mounted on one of the sides of the display panel, thereby adding width to the panel assembly. In the past, the keyboard in a laptop computer was usually wider than the display, however, as display size increases beyond the size of the keyboard in more recent laptop computers, it is desirable to move the inverter circuit from the side of the display to another location to avoid increasing the width of the display housing. The inverter circuit may be located behind the display panel, however, it is desirable to avoid increasing the depth of the panel assembly. Additionally, the repositioned inverter circuit must not cause radio frequency interference or electromagnetic interference with the display. In the prior art, some display assemblies include thermal and radiation shields, however, these shields add cost, increase parasitic losses, induce eddy currents, and increase the amount of material that must be included with the display assembly.

As notebook computer displays increase in physical size, the power required to illuminate the display also increases. To improve customer satisfaction with portable battery-operated equipment, in particular notebook computers, it is desired to provide equipment that is highly energy efficient and as lightweight and compact as possible. Further, computer display panels currently incorporate numerous components that must be integrated by equipment manufacturers. It is desirable to integrate the functionality of the components into one standardized assembly to reduce manufacturing cost and complexity.

SUMMARY OF THE INVENTION

The present invention advantageously integrates an inverter circuit with a feedback and control circuit to provide a compact, lightweight, and cost-effective design for driving CCFLs. In one embodiment, the present invention provides an inverter circuit for providing a drive signal to operate a fluorescent lamp comprising a pulse width modulator coupled to receive a feedback signal indicative of current in the fluorescent lamp. The pulse width modulator generates driving signals that are received by a synchronously switching voltage regulator having a high side driver and a low side driver. A self-resonant converter is coupled to the fluorescent lamp and generates a voltage signal for illuminating the fluorescent lamp. The self-resonant converter includes a transformer having a primary winding and at least one secondary winding, a capacitor coupled in parallel with the primary winding, and a full bridge circuit. The full bridge circuit may include four switching transistors, such as MOS- FETs coupled in an H-configuration to the primary winding and the capacitor.

In one embodiment, the inverter circuit also includes a zero voltage detector coupled to control switching of the synchronously switching voltage regulator based on voltage input to the self-resonant converter. The inverter circuit also includes a timer circuit coupled to transmit and receive signals from the self-resonant converter and to receive signals from the zero voltage detector. The timer circuit outputs signals to control the frequency of oscillation in the self-resonant converter based on the signals from the self-resonant converter and the zero voltage detector.

In another embodiment, the inverter circuit includes an over voltage monitor and control circuit coupled to receive signals from the self-resonant converter and to transmit signals to the pulse width modulator.

In another embodiment, a first terminal of the at least one secondary transformer winding is coupled to one end of the fluorescent lamp, a second terminal of the at least one secondary transformer winding is coupled to ground, and another end of the fluorescent lamp is coupled to a rectifier. The rectifier is coupled to receive a signal indicative of the current at an end of the fluorescent lamp.

In another embodiment, the self-resonant converter further includes a first secondary transformer winding having a first terminal coupled to one end of the fluorescent lamp, a second secondary transformer winding having a first terminal coupled to another end of the fluorescent lamp, a first sense resistor coupled between the first secondary transformer winding and the second secondary transformer winding, a rectifier coupled to receive a signal indicative of the current at an end of the fluorescent lamp, and a second sense resistor coupled between one terminal of the first sense resistor and another terminal of the second secondary transformer winding.

In another embodiment, the fluorescent lamp is connected to the inverter circuit in a floating configuration for greater energy efficiency. This embodiment includes a transformer with a primary winding and two secondary windings, a first switch having one terminal coupled between the first sense resistor and the first secondary transformer winding, a second switch having one terminal coupled between the second sense resistor and the second secondary transformer winding, and a ground reference resistor having one terminal coupled to ground between the first sense resistor and the second sense resistor. The other terminal of the ground reference resistor is coupled to another terminal of the first switch and another terminal of the second switch.

The present invention also provides a method of generating voltage signals for illuminating a fluorescent lamp using a dual converter circuit, wherein the dual converter circuit includes a synchronously switching voltage regulator coupled to a self-resonant converter, and a pulse width modulator coupled to receive a reference signal and a feedback signal indicative of current in the fluorescent lamp. The method comprises generating drive signals with the pulse width modulator. The drive signals are based on the reference signal and the feedback signal. The method further includes inputting the drive signals to the switching voltage regulator to control operation of the switching voltage regulator, generating a first voltage signal based on the drive signals, inputting the first voltage signal to the self-resonant converter, generating a second voltage signal based on the first voltage; and inputting the second voltage to the fluorescent lamp.

In another embodiment, the self-resonant converter includes a transformer having a primary winding, at least one secondary winding, and a capacitor coupled in parallel with the primary winding. The method further comprises coupling a bridge circuit having four switching transistors in an H-configuration to the primary winding and the capacitor, and controlling operation of the self-resonant converter using the bridge circuit.

In another embodiment, the method further comprises controlling switching of the synchronously switching voltage regulator using a zero voltage detector that generates a zero crossing signal based on voltage input to the self-resonant converter.

In another embodiment, the method further comprises coupling a timer circuit to transmit and receive signals from the self-resonant converter and to receive signals from the zero voltage detector, and controlling the frequency of oscillation in the self-resonant converter based on the signals from the self-resonant converter and the zero voltage detector.

In another embodiment, the method further comprises coupling an over voltage monitor and control circuit to receive signals from the self-resonant converter and to transmit signals to the pulse width modulator.

In another embodiment, the self-resonant converter includes a transformer having a primary side with a primary transformer winding, and a secondary side with a first secondary transformer winding and a second secondary transformer winding. The lamp is connected in a floating configuration for greater energy efficiency by coupling a first terminal of the first secondary transformer winding to one end of the fluorescent lamp, coupling a first terminal of the second secondary transformer winding to another end of the fluorescent lamp, coupling a first sense resistor between the first secondary transformer winding and the second secondary transformer winding, and coupling a rectifier to the secondary side of the transformer to generate the feedback signal. The method further comprises driving the first secondary transformer winding with a first AC drive signal, driving the second secondary transformer winding with a second AC drive signal that is out of phase with the first AC drive signal, and generating a feedback signal indicative of current through at least one end of the fluorescent lamp.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present invention is described herein as being applied to a laptop computer displays, many of which are backlighted by one or more cold cathode fluorescent lamps (CCFLs). It is recognized, however, that the present invention may be utilized in many other applications utilizing one or more CCFLs.

Figure 1:
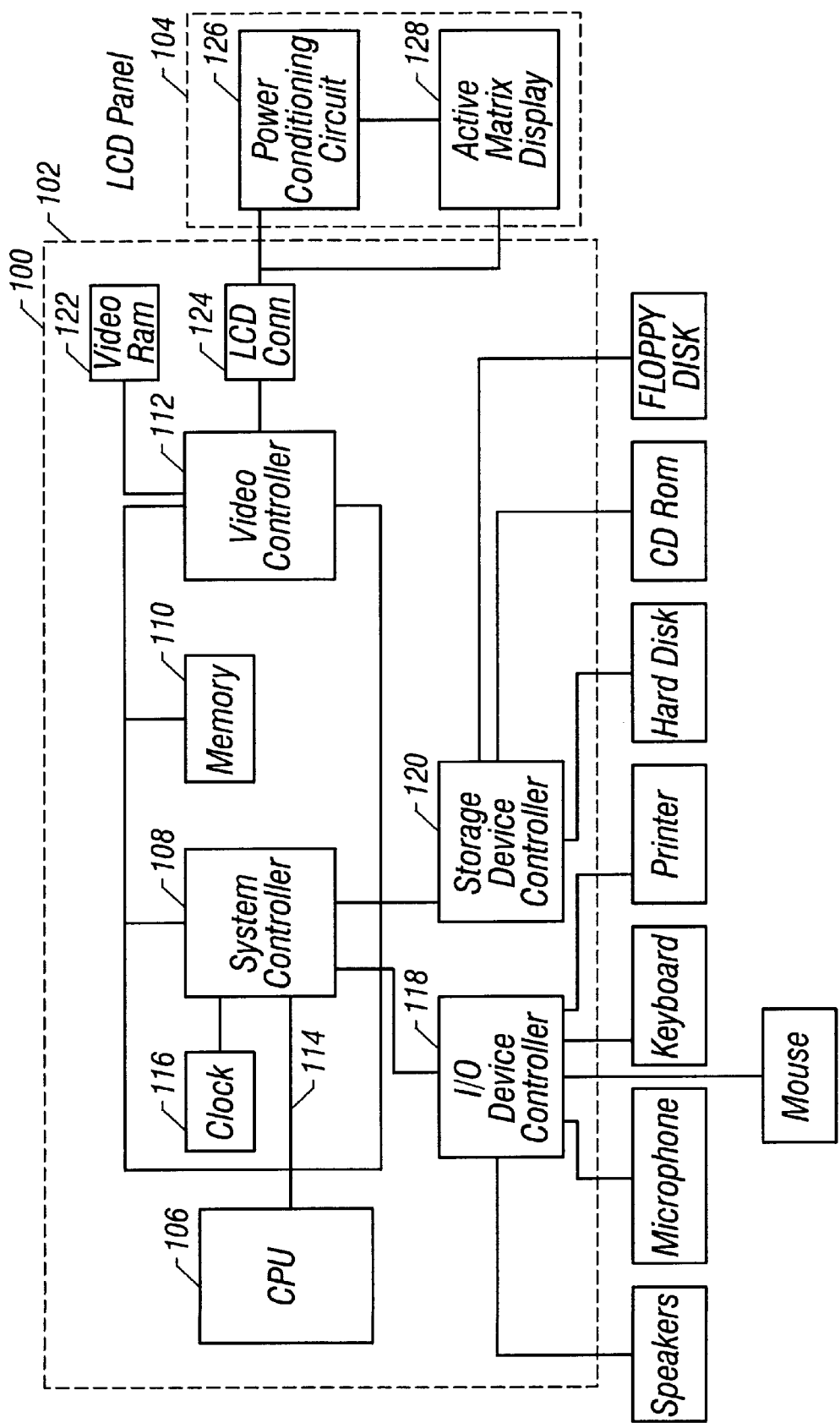
FIG. 1 is a block diagram of components included in a portable computer system.

Referring to FIG. 1, a simplified block diagram of portable computer system 100 is shown including base unit 102 and liquid crystal display (LCD) panel 104 that are electrically coupled for transmitting and receiving data and control signals between them. Base unit 102 includes central processing unit (CPU) 106 which may be one or more microprocessors that provide the main data processing capability of the computer system 100. CPU 106 is coupled to system controller 108, memory 110, and video controller 112 via bus 114. Bus 114 may be comprised of one or more separate busses that are be coupled for data transfer between components of computer system 100. Clock 116 is coupled to system controller 108. System controller 108 provides address and control signals to allow read and write access to memory 110 via bus 114.

Various special purpose controllers are included in computer system 100 including one or more input/output (I/O) device controllers 118, storage device controllers 120, and video controller 112. I/O device controllers 118 are coupled as known to respective I/O devices such as audio speakers, a microphone, a mouse, a keyboard, and a printer to allow a user to input data and receive information from computer system 100. Storage device controllers 120 may control the operation of different types of data storage devices such as hard disk drives, floppy disk drives, and compact disc drives. Video controller 112 is coupled to video random access memory (RAM) 122 and liquid crystal display (LCD) connector 124 for electrically coupling LCD panel 104 to base unit 102. LCD connector 124 is electrically coupled to power conditioning circuit 126 and active matrix display 128. Video controller 112 is connected to bus 114 to provide video and control signals to LCD panel 104 through LCD connector 124. Video RAM 122 is connected to video controller 112 for storage of video data. Video data is provided by video controller 112 through LCD connector 124 to LCD drivers (not shown) inside the LCD panel 104 to activate the pixels of active matrix display 128.

Figure 2:
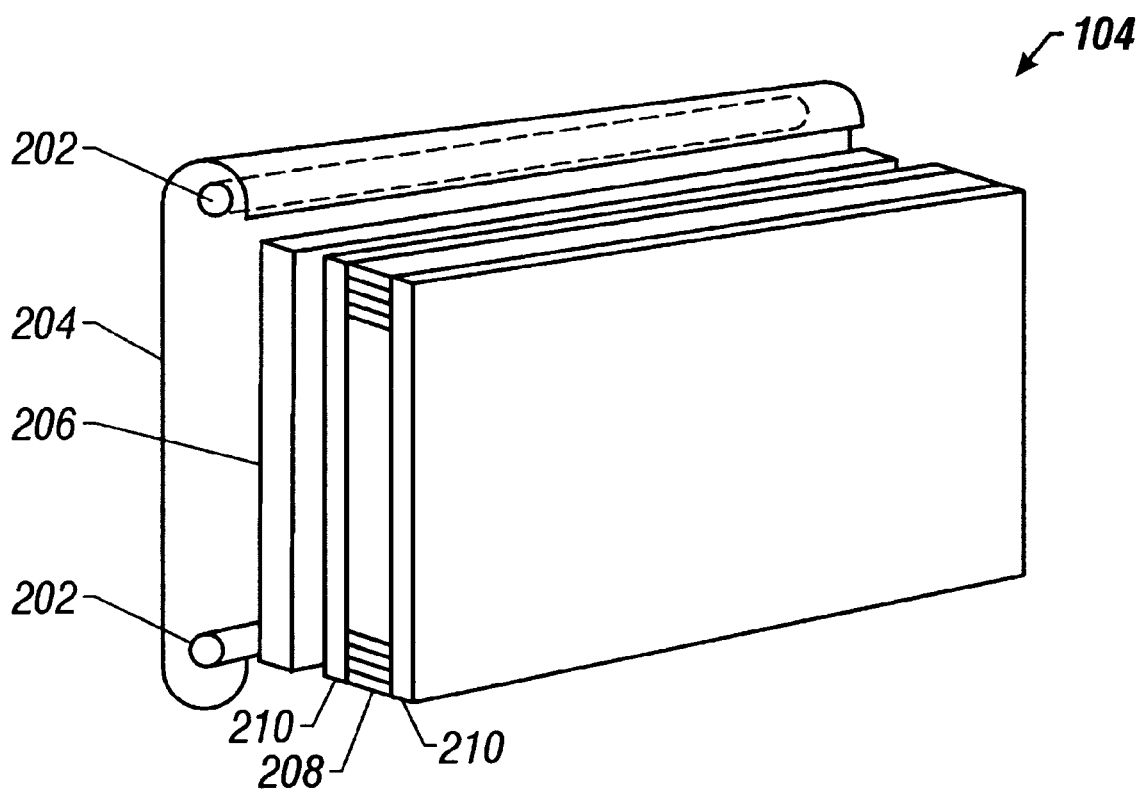
FIG. 2 is a perspective view of a diagram of a typical configuration of components in a liquid crystal display assembly utilizing cold cathode fluorescent lamps for backlighting.

Also provided to LCD panel 104 through LCD connector 124 are DC power supply voltages which are input to power conditioning circuit 126. Active matrix display 128 requires a light source for illumination of pixels. FIG. 2 shows components included in a typical LCD panel 104 including one or more light sources for illumination, such as CCFLs 202, light reflector 204, light diffusion plate 206, liquid crystal 208, and polarizing plates 210. CCFLs 202 require an AC power supply voltage. Accordingly, power conditioning circuit 126 converts DC voltages supplied by computer system 100 to AC voltage using a DC to AC inverter (not shown). A feedback and control circuit (not shown) is also included in power conditioning circuit 126 to regulate the current supplied to illuminate CCFLs.

Figure 3:
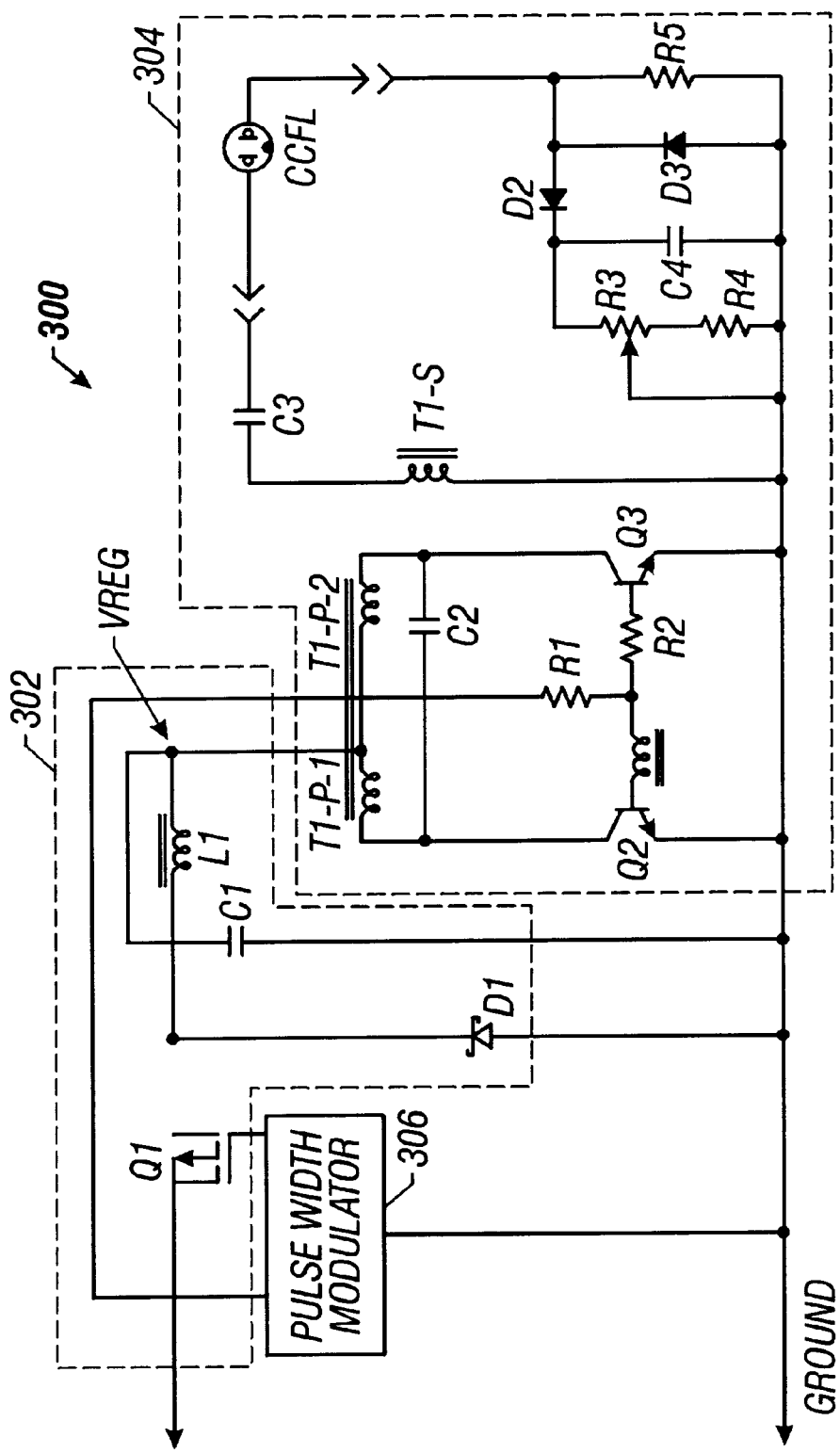
FIG. 3 is a block diagram of a prior art inverter circuit.

FIG. 3 shows an inverter circuit 300 known generally as a Royer oscillator including buck regulator 302, oscillator 304, and pulse width modulator (PWM) 306. Voltage $V_{dc}$ is a DC voltage source input to buck regulator 302 which includes switching transistor Q1, free-wheeling diode D1, inductor L1, and capacitor C1. Buck regulator 302 steps $V_{dc}$ down proportionally to the duty cycle of switching transistor Q1. PWM 306 samples current through CCFL by tapping resistor R3 and using the feedback to drive the gate of switching transistor Q1 to control its duty cycle, and thus the voltage delivered to oscillator 304. The pulse frequency of PWM is selected to permit the signal to be filtered by the low pass filter created by L1 and C1. Switching transistors Q2 and Q3 are base-coupled to ground and alternately conduct current due to the positive feedback between increasing collector current and increasing base current generated by the inductive coupling of the primary transformer windings T1-P-1, T1-P-2, and T1-P-3.

When Q2 switches ON with a small base current limited by resistor R1, then the collector current of Q2 increases and the positive feedback from winding T1-P-1 to winding T1-P-3 will drive the base more positive while driving the base of Q3 negative to keep Q3 turned OFF. Q2 turns quickly fully ON. $V_{reg}$ appears primarily across winding T1-P-1 as the collector current ramps up. The core of transformer T1 may saturate as the collector current continues to increase. The gain of Q2 is inversely proportional to collector current. Therefore, the rate of increase of the collector current peaks and the voltage drop across winding T1-P-1 falls with the collector voltage of Q2 increasing up to $V_{reg}$. The slowing rate of increase of the collector current implies a drop in the positive feedback to the base of Q2, and this feeds back on itself to quickly turn off Q2 and drop the collector current. The flux in transformer Ti collapses, which induces a negative bias at the base of Q2 and a positive bias at the base of Q3 to turn ON Q3. The increasing collector current through winding T1-P-2 provides positive feedback to winding T1-P-3 to fully turn on Q3, similar to the positive feedback for Q2. The fall off will decrease the rate of collector current increase and the consequent drop in positive feedback turns OFF Q3. The turn OFF of Q3 correspondingly turns ON Q2.

The windings T1-P-1 and T1-P-2 have opposite orientations, so the secondary current through T1-S changes direction when Q3 turns on and Q2 turns off. The ratio of the number of turns in one of the primary windings carrying a collector current to the number of turns in the secondary winding together with the magnitude of $V_{reg}$ determines the magnitude of the induced secondary voltage applied across CCFL. To generate a high voltage to turn CCFL ON, the ratio of the primary windings to the secondary winding is high, for example, 300 secondary to 1 primary. Capacitor C3 is much larger than the capacitance of CCFL when it is not conducting, so the high voltage appears primarily across CCFL. Once CCFL sustains an arc, it provides a relatively smaller voltage drop, for example 200–300 volts. Capacitor C3 plus resistance from the secondary winding T1-S provides impedance for the remaining voltage drop in the secondary circuit.

Resistors R5, R3, and R4 provide sampling signals of the CCFL current for feedback to PWM 306. As diode D2 charges capacitor C4 to peak positive voltage across resistor R5, resistors R3 and R4 provide small leakage current from capacitor C4 and also provide a tap to PWM 306. When voltage in the secondary circuit is above a threshold value, PWM 306 lowers the duty cycle of switching transistor Q1, thereby lowering $V_{reg}$, collector currents, and secondary voltage.

In the present invention, an inverter circuit is provided which eliminates center tap and tertiary base drive windings, such as third primary winding T1-P-3 and resistor R1 in inverter circuit 300. Removing the center tap and tertiary base drive winding results in a smaller, less expensive, and more efficient transformer.

Figure 4:
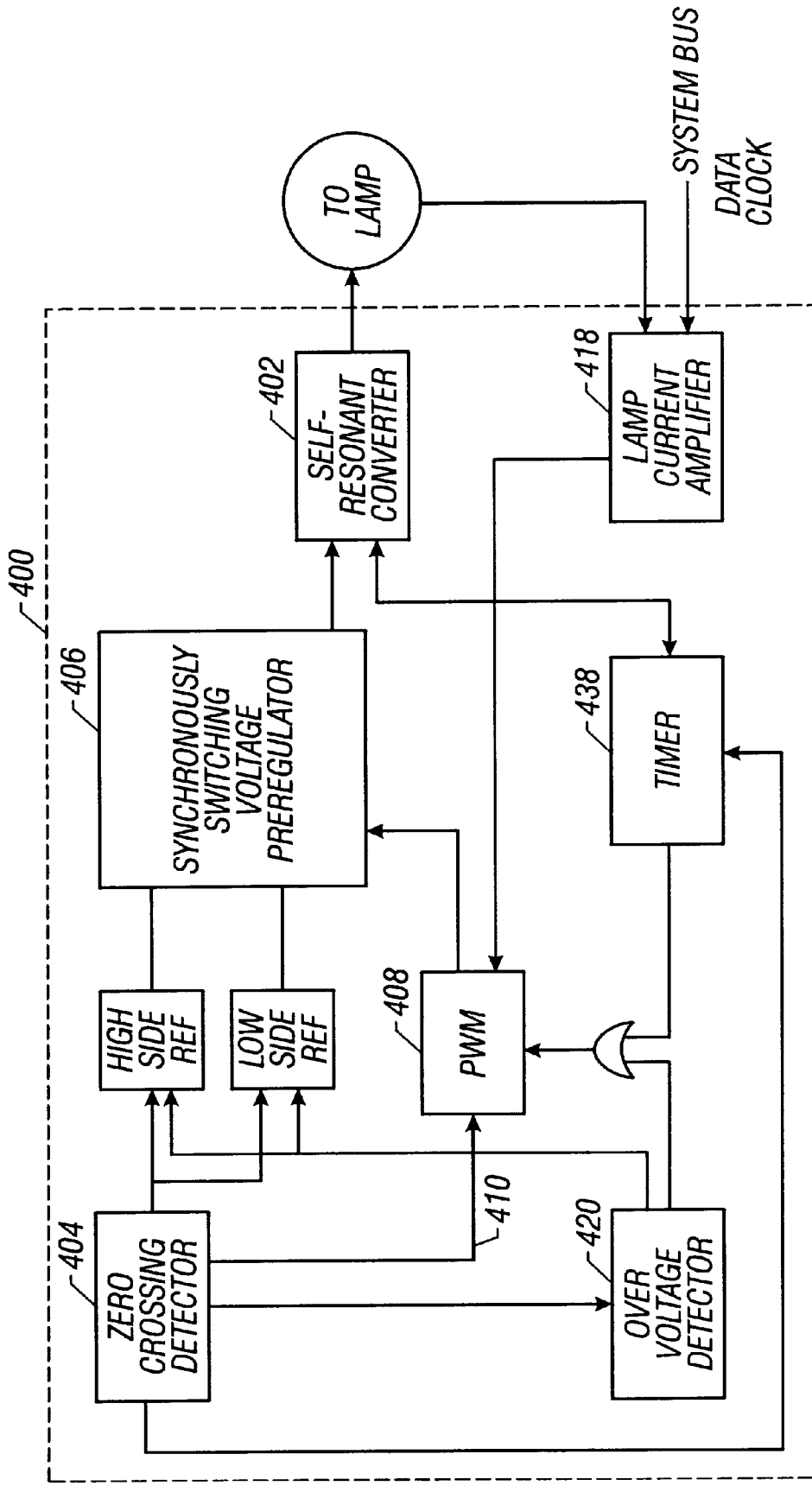
FIG. 4 is a block diagram of components included in a power circuit according to the present invention.
Figure 4A:
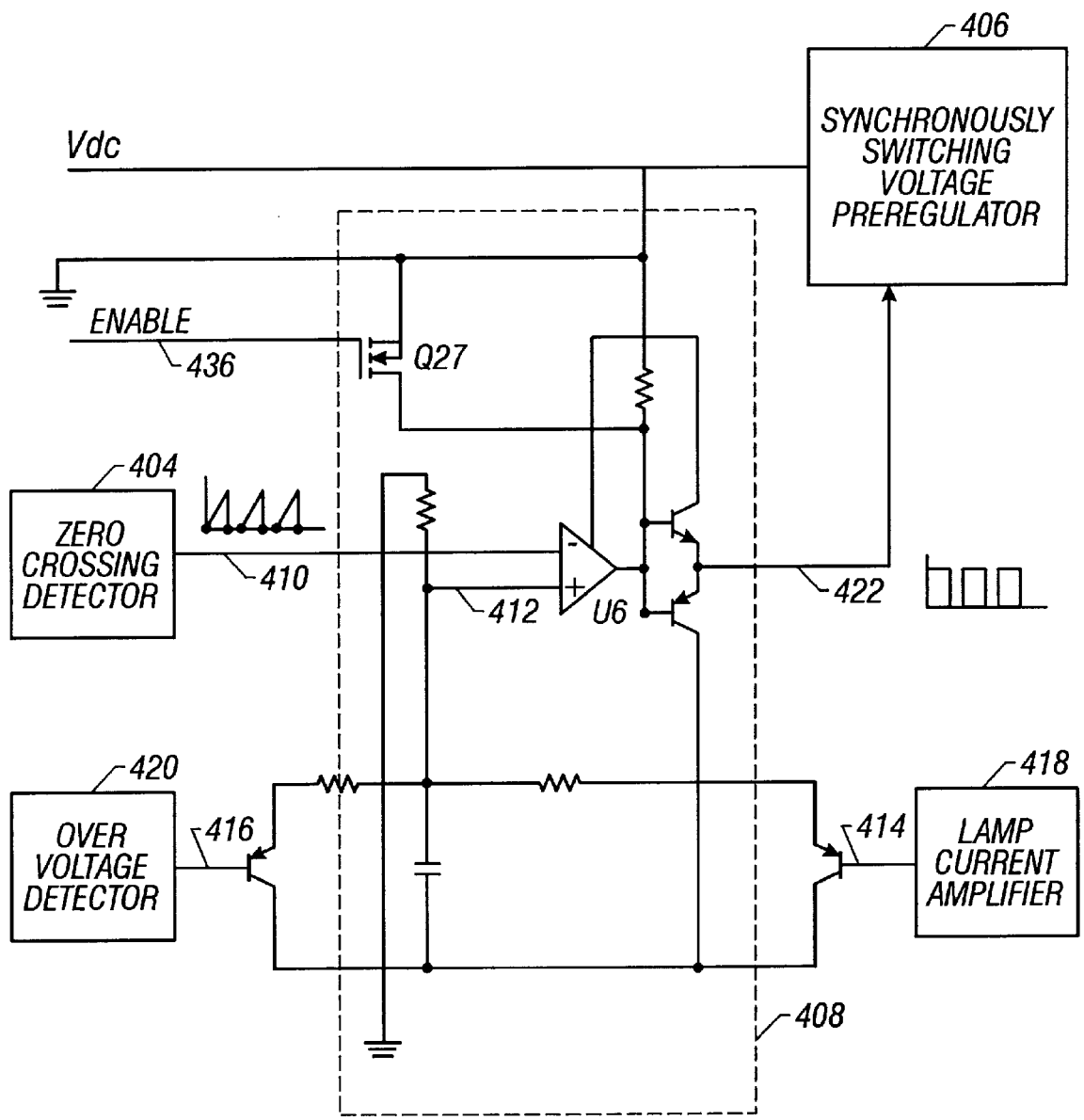
FIGS. 4A–4E are a schematic diagrams of embodiments of the components in the inverter circuit according to the present invention.

FIG. 4 shows a block diagram of components in inverter circuit 400 according to the present invention which includes a self-resonant converter 402 with a zero crossing detector 404 for zero voltage switching, and an adaptive, asynchronously switching voltage pre-regulator 406 with anti-cross conduction. Inverter circuit 400 includes pulse width modulator (PWM) 408 coupled to receive ramp input signal 410 from zero crossing detector 404. A detailed schematic diagram of an embodiment of PWM 408 is shown in FIG. 4A. PWM 408 receives error signal 412 which is generated by logically "OR"ing feedback signal 414 with over-voltage signal 416. Feedback signal 414 from lamp current amplifier 418 is indicative of current in the fluorescent lamp and over-voltage signal 416 is proportional to voltage input to the lamp.

Figure 4B:
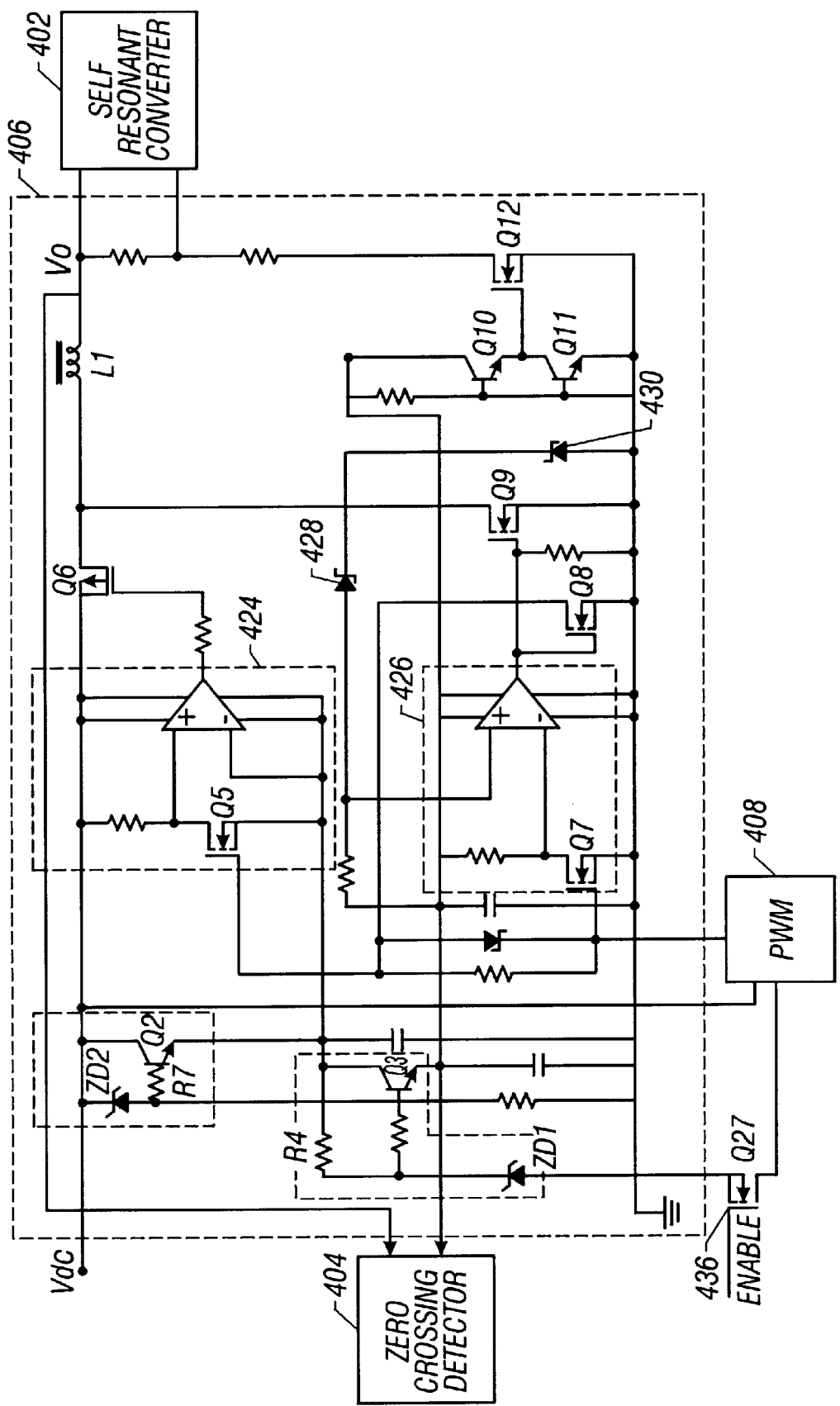
Figure 5A:
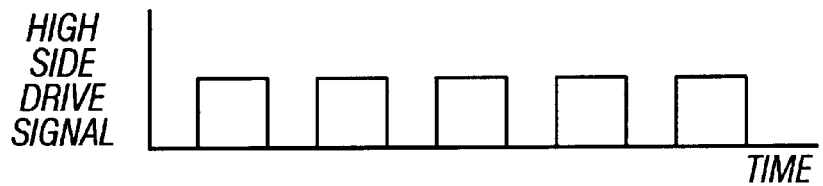
FIGS. 5A–5E show time history diagrams of voltages at various locations of the present inverter circuit.
Figure 5B:
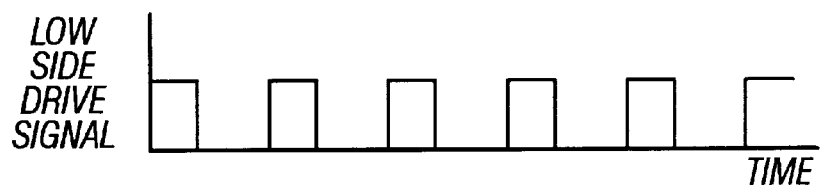
Figure 5C:
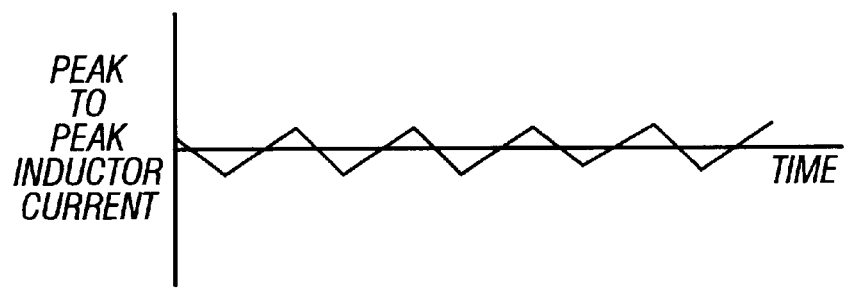

A schematic diagram of an embodiment of synchronously switching voltage pre-regulator 406 is shown in FIG. 4B including high side driver 424 and low side driver 426. Switching voltage pre-regulator 406 operates from unregulated DC supply voltage $V_{dc}$ such as a battery (not shown). Voltage $V_o$ is the average voltage applied to inductor L1. In order to supply alternating current, MOSFETs Q6 and Q9 are driven by high side driver 424 and low side driver 426, respectively. The alternating sequence of open and close actions by switching MOSFETs Q6 and Q9 regulates the voltage such that the longer the time switching MOSFETs Q6 and Q9 are closed, the higher the regulated voltage due to the higher average current flowing through inductor L1. MOSFETs Q7 and Q5 shift the level of PWM signal 422 appropriately for input to high side driver 424 and low side driver 426, respectively. Reference voltage to high side driver 424 is provided by an internal voltage source supplying power to zener diode ZD2, resistor R7, and bipolar transistor Q2. Reference voltage to low side driver 426 is provided by an internal source supplying power to zener diode ZD1, resistor R4, and bipolar transistor Q3. Delay mechanisms, such as diode 428 and MOSFET Q8 are incorporated in switching voltage pre-regulator 406 to ensure that MOSFET Q7 turns OFF before MOSFET Q5 turns ON and vice versa. FIGS. 5A through 5C show examples of time history graphs of pulse waveform output signals from high side driver 424 and low side driver 426 and time history of peak to peak current through inductor L1, respectively.

Figure 4C:
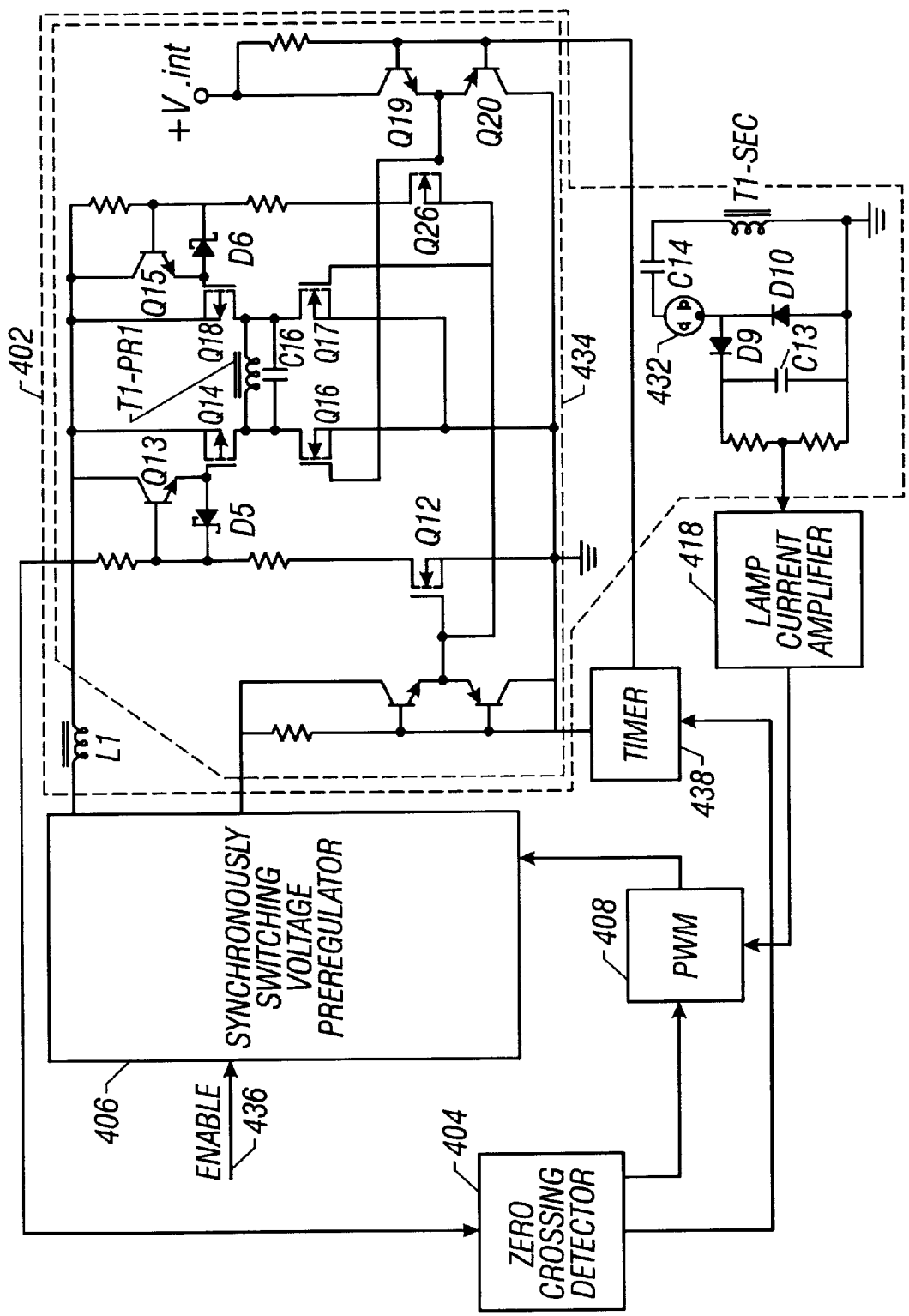

The voltage $V_o$ output by synchronously switching voltage pre-regulator 406 is input to self-resonant converter 402. A schematic diagram of self-resonant converter 402 is shown in FIG. 4c. Self-resonant converter 402 includes a free-running oscillator 434 wherein a full-bridge rectifier formed by MOSFETs Q14, Q16, Q17, and Q18, is electrically coupled to capacitor C16 and transformer primary winding T1-PRI. Secondary transformer winding T1-SEC has one terminal coupled to one end of fluorescent lamp 432 through ballast capacitor C14, and a second terminal coupled to ground. The other end of fluorescent lamp 432 is coupled to a rectifier that receives a signal indicative of current flowing through fluorescent lamp 432. The rectifier in FIG. 4c is shown as diode D9 coupled to diode D10. Diode D10 prevents voltage drop across resistors R40 and R41 by blocking current during one half of the drive waveform cycle. Diode D10 may be eliminated, however, the energy efficiency of inverter circuit 400 will decrease correspondingly.

Alternative embodiments for increasing energy efficiency in the present invention may incorporate the invention disclosed in pending U.S. patent application entitled "Balanced Feedback System For Floating Cold Cathode Fluorescent Lamps," (Attorney Docket No. M-5996 US), which application is assigned to the same assignee as the present application, and is hereby incorporated by reference. The above-referenced application provides an apparatus and method for driving a cold cathode fluorescent lamp in a floating configuration with an inverter circuit having a transformer with a primary winding and two secondary windings. At least one sense resistor is coupled in series between terminals of the secondary windings. The other terminal of each secondary winding is coupled to a respective end of the fluorescent lamp. A rectifier is coupled to the secondary portion of the transformer to receive a signal indicative of the current in at least one end of the fluorescent lamp and generates a feedback signal. Drive signals based on the feedback signal are used to adjust the current in the fluorescent lamp.

Figure 6:
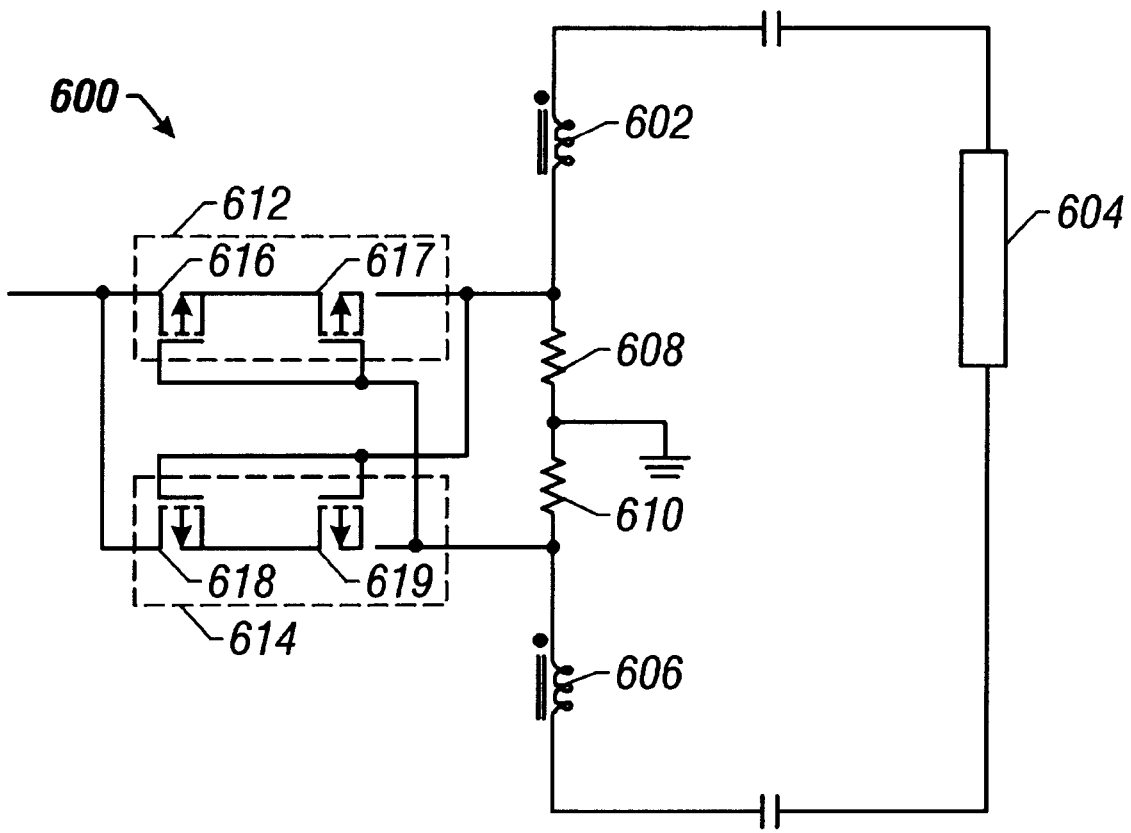
FIG. 6 is a schematic diagram of another embodiment of an inverter circuit according to the present invention.

For example, one embodiment of the present invention may incorporate rectifier circuit 600 shown in FIG. 6 which includes first secondary transformer winding 602 coupled to one end of fluorescent lamp 604, second secondary transformer winding 606 coupled to another end of fluorescent lamp 604, first sense resistor 608 coupled between the first secondary transformer winding 602 and the second secondary transformer winding 606, a second sense resistor 610 coupled between one terminal of the first sense resistor 608 and another terminal of the second secondary transformer winding 606. The rectifier portion of circuit 600 includes first switch 612 having one terminal coupled between first sense resistor 608 and first secondary transformer winding 602 and a second switch 614 having one terminal coupled between second sense resistor 610 and second secondary transformer winding 606. First switch 612 and second switch 614 may be implemented using diodes or MOSFET devices such as MOSFETs 616 through 619 as shown in FIG. 6. This configuration balances the amount of voltage applied to the ends of lamp 604 and therefore reduces the parasitic capacitance induced in driving lamp 604 which occurs when a high voltage exists at one end of lamp 604 and the other end of lamp 604 is tied to ground. Further advantages of this configuration are discussed in the above-referenced application.

When enable signal 436 is HIGH, circuit logic in PWM 408 as shown in FIG. 4A causes output of a HIGH signal from comparator U6. This causes MOSFET Q6 to turn on. Current flows through MOSFET Q6 and inductor L1 (FIG. 4b), and voltage is applied to the high side of the H-bridge configuration formed by MOSFETS Q14 and Q18 (FIG. 4c). Bridge diagonal pairs Q16–Q17 and Q14–Q18 alternately conduct current through primary winding T1-PRI and capacitor C16. Each diagonal pair is ON for approximately 50% of the cycle. The frequency of the cycle is determined by the value of capacitor C16. To illuminate a CCFL, the cycle frequency is approximately 50 kilohertz, however, capacitor C16 may be selected to provide a different desired frequency.

Figure 4D:
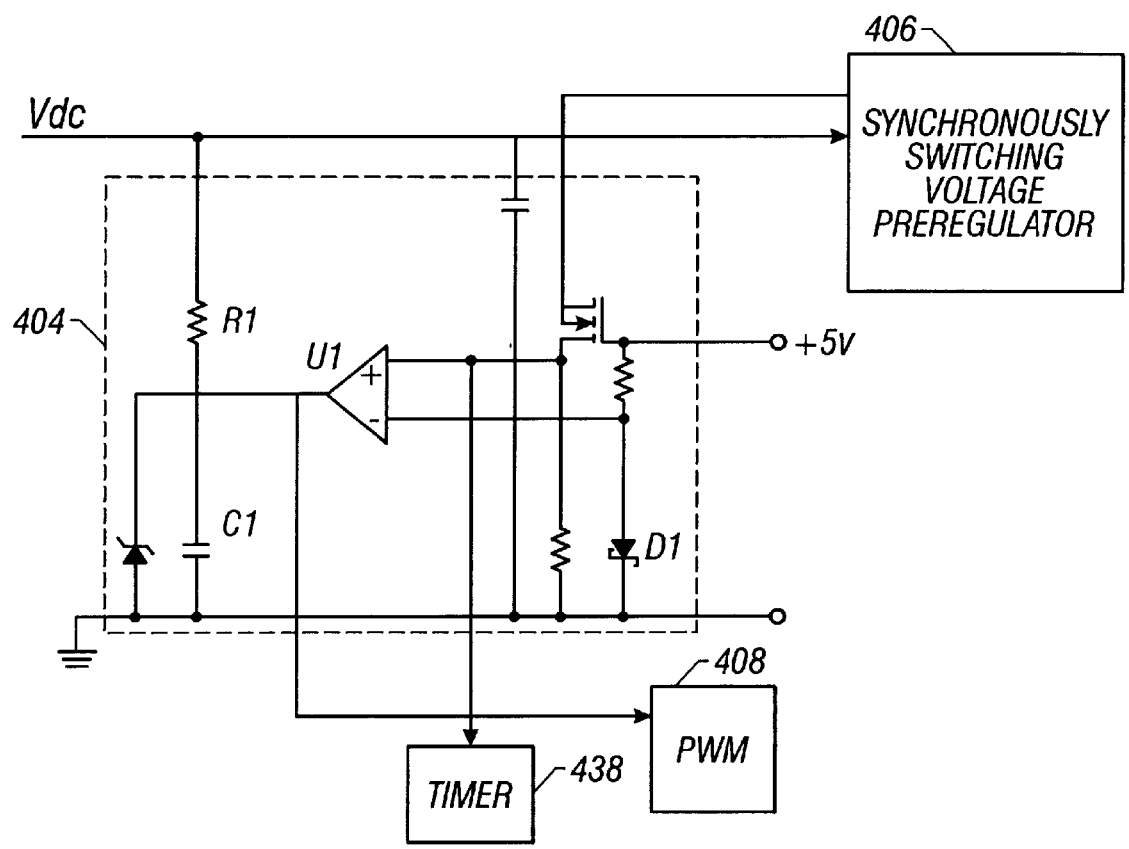
Figure 5D:
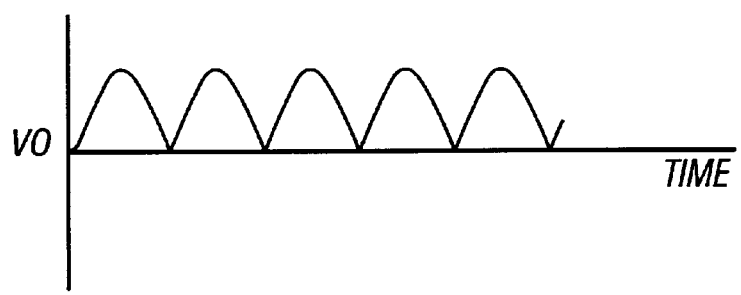

A time history diagram of voltage $V_o$ across the bridge high side formed by MOSFETS Q14 and Q18 is shown in FIG. 5D. Zero crossing detector 404 shown in FIG. 4D detects when voltage $V_o$ resonates down to zero by receiving voltage signal $V_o$ from switching voltage pre-regulator 406 and comparing it to a reference voltage provided by an internal voltage supply, such as an internal 5 volt battery. When voltage $V_o$ resonates down to zero, the following events take place in inverter 400:

1. The output of comparator U1 in zero voltage switching circuit 404 is set HIGH causing capacitor C1 to discharge.
2. Timer 438 resets and begins timing the new cycle.
3. Synchronously switching voltage regulator 406 switches from high side driver to low side driver, or from low side driver to high side driver, depending on the driver being used as the time of the switch.
4. The diagonal pair of H-bridge switching transistors being used turns OFF and the opposite pair of H-bridge switching transistors turns ON.

Figure 5E:
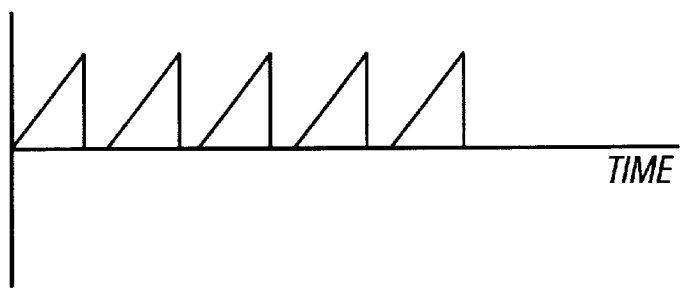

In FIG. 4c, Inductor L1, transformer primary winding T1-PRI, and capacitor C16 form a tank circuit that generates sinusoidal voltage and current signals across the self-resonant converter 402. In FIG. 4d, at any time that voltage $V_o$ is greater than zero, the output of comparator U1 is LOW. Capacitor C1 combined with resistor RI creates a ramp voltage as shown in FIG. 5E that is input to PWM 408.

Figure 4E:
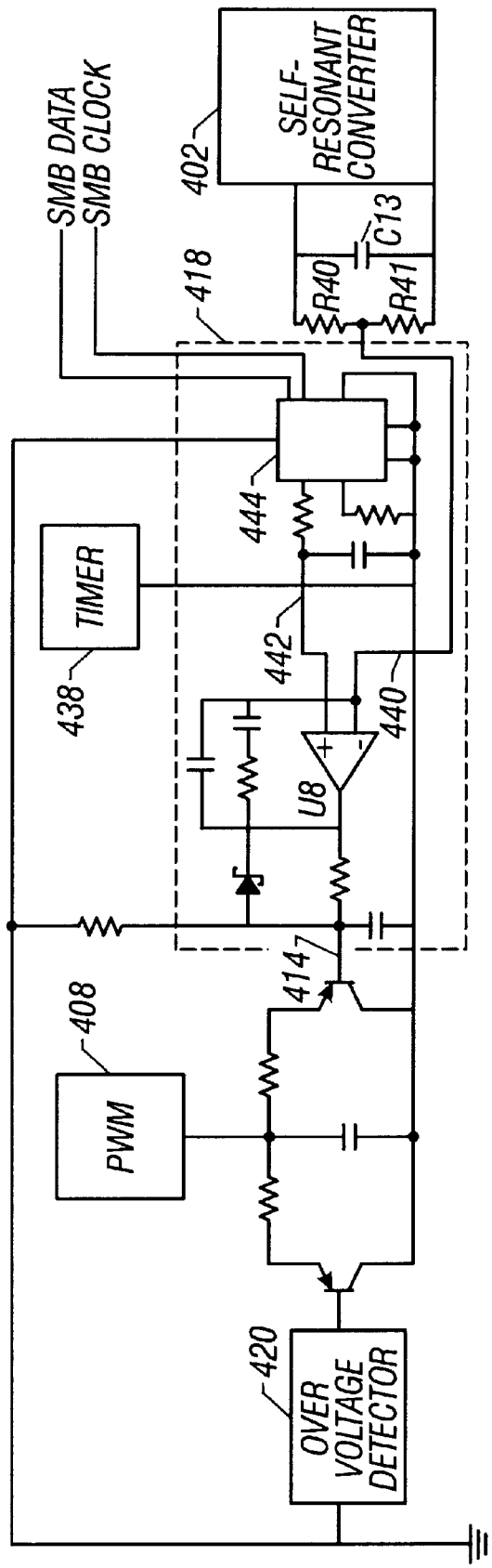

FIG. 4E shows a schematic diagram of lamp current amplifier 418 that provides feedback signal 414 to PWM 408. Difference amplifier U8 receives signal 440 indicative of current across lamp 432 sensed at resistors R40 and R41. Signal 440 is compared to a reference voltage 442 derived using data SMB_DATA from system management bus (not shown) and potentiometer 444. Feedback signal 414 is then used to control the pulse width of PWM signal 422 that is input to switching voltage regulator 406. Lamp current is therefore controlled by adjusting the amount of time that Q6 is ON.

The present invention provides an integrated inverter circuit 400 with dual converters for monitoring and controlling illumination of CCFLs. The present invention is especially advantageous for use in portable, battery operated devices such as laptop computers, as it is a compact and energy-efficient solution for providing power to CCFLs. It is known that MOSFET devices dissipate less power than diodes during operation. The present invention thus includes dual converters that rely primarily on MOSFETs instead of junction diodes. Switching voltage regulator 406 includes MOSFETs Q5, Q6, Q7, Q8, and Q9 for synchronous switching to supply power to inductor L1. Diode 430 in FIG. 4b is used during the switch from high side driver 424 to low side driver 426, just until low side driver 426 is able to switch MOSFET Q9 ON. Likewise, self-resonant converter 402 utilizes MOSFETs Q14, Q16, Q17, and Q18 instead of junction diodes, further conserving energy while providing power to drive lamp 432.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A computer system comprising:
   a display assembly including a cold cathode fluorescent lamp; and
   an inverter circuit connected to the cold cathode fluorescent lamp, the inverter circuit including:
      a pulse width modulator coupled to receive a reference signal and a feedback signal indicative of current in the cold cathode fluorescent lamp, the pulse width modulator being operable to generate driving signals;
      a synchronously switching voltage regulator having a high side driver and a low side driver coupled to receive the driving signals from the pulse width modulator;
      a self-resonant converter coupled between the synchronously switching voltage regulator and the cold cathode fluorescent lamp, the self-resonant converter being coupled to receive a voltage signal from the synchronously switching voltage regulator, the self-resonant converter being operable to generate another voltage signal for illuminating the cold cathode fluorescent lamp; and
      a timer circuit coupled to transmit and receive signals from the self-resonant converter and to receive signals from a zero voltage detector, the timer circuit being operable to control frequency of oscillation in the self-resonant converter based on the signals from the self-resonant converter and the zero voltage detector.

2. The computer system, as set forth in claim 1, wherein the zero voltage detector is coupled to control switching of the synchronously switching voltage regulator based on voltage input to the self-resonant converter.

3. The computer system, as set forth in claim 1, further comprising an over voltage monitor and a control circuit coupled to receive signals from the self-resonant converter and to transmit signals to the pulse width modulator.

4. The computer system, as set forth in claim 1, wherein the self-resonant converter includes:
   a transformer having a primary winding and at least one secondary winding;
   a capacitor coupled in parallel with the primary winding; and
   a bridge circuit having four switching transistors coupled in an H-configuration to the primary winding and the capacitor.

5. The computer system, as set forth in claim 4, wherein a first terminal of the at least one secondary transformer winding is coupled to one end of the cold cathode fluorescent lamp, a second terminal of the at least one secondary transformer winding is coupled to ground, and another end of the cold cathode fluorescent lamp coupled to a rectifier, the rectifier being coupled to receive a signal indicative of the current at an end of the cold cathode fluorescent lamp.

6. The computer system, as set forth in claim 4, wherein the self-resonant converter further comprises:
   a first secondary transformer winding having a first terminal coupled to one end of the cold cathode fluorescent lamp;
   a second secondary transformer winding having a first terminal coupled to another end of the cold cathode fluorescent lamp;
   a first sense resistor coupled between the first secondary transformer winding and the second secondary transformer winding; and
   a rectifier coupled to receive a signal indicative of the current at an end of the cold cathode fluorescent lamp.

7. The computer system, as set forth in claim 5, further comprising:
   a second sense resistor coupled between one terminal of the first sense resistor and a terminal of the second secondary transformer winding, wherein the rectifier includes:
      a first diode having an anode coupled between the first sense resistor and the first secondary transformer winding;

a second diode having an anode coupled between the second sense resistor and the second secondary transformer winding; and a ground reference resistor having one terminal coupled to ground between the first sense resistor and the second sense resistor, the other terminal of the ground reference resistor coupled to the cathode of the first diode and the cathode of the second diode in series with the first diode and the second diode.

8. The computer system, as set forth in claim 4, further comprising:

a second sense resistor coupled between one terminal of the first sense resistor and another terminal of the second secondary transformer winding, wherein the rectifier includes:

a first switch having one terminal coupled between the first sense resistor and the first secondary transformer winding;

a second switch having one terminal coupled between the second sense resistor and the second secondary transformer winding; and a ground reference resistor having one terminal coupled to ground between the first sense resistor and the second sense resistor, the other terminal of the ground reference resistor coupled to another terminal of the first switch and another terminal of the second switch.

9. The computer system, as set forth in claim 4, wherein the rectifier includes:

a first diode having an anode coupled between the first sense resistor and the first secondary transformer winding;

a ground reference resistor having one terminal coupled to ground between the first sense resistor and the second secondary transformer winding, the other terminal of the ground reference resistor coupled to the cathode of the first diode in series with the first diode; and a second diode having an anode coupled to the one terminal of the second sense resistor, the second diode having a cathode coupled to the anode of the first diode.

10. The computer system, as set forth in claim 4, wherein the self-resonant converter further comprises:

a first secondary transformer winding having a first terminal coupled to one end of the cold cathode fluorescent lamp;

a first diode having an anode coupled between the first sense resistor and the first secondary transformer winding;

a ground reference resistor having one terminal coupled to ground between the first sense resistor and the second secondary transformer winding, the other terminal of the ground reference resistor coupled to the cathode of the first diode in series with the first diode;

a second diode having an anode coupled to the one terminal of the second sense resistor, the second diode having a cathode coupled to the anode of the first diode; and a first sense resistor coupled between the first secondary transformer winding and the second secondary transformer winding.

11. An inverter circuit for providing a drive signal to operate a fluorescent lamp, the inverter circuit comprising:

a pulse width modulator coupled to receive a reference signal and a feedback signal indicative of current in the fluorescent lamp, the pulse width modulator being operable to generate driving signals;

a synchronously switching voltage regulator having a high side driver and a low side driver coupled to receive the driving signals from the pulse width modulator; and a timer circuit coupled to transmit and receive signals from a self-resonant converter and to receive signals from a zero voltage detector, the timer circuit being operable to control frequency of oscillation in the self-resonant converter based on the signals from the self-resonant converter and the zero voltage detector.

12. An inverter circuit for providing a drive signal to operate a fluorescent lamp, the inverter circuit comprising:

a self-resonant converter coupled to the fluorescent lamp, the self-resonant converter being operable to receive an input voltage signal and to generate another voltage signal for illuminating the fluorescent lamp, the self-resonant converter including:

a transformer having a primary winding and at least one secondary winding;

a capacitor coupled in parallel with the primary winding;

a bridge circuit having four switching transistors coupled in an H-configuration to the primary winding and the capacitor; and a timer circuit coupled to transmit and receive signals from a self-resonant converter and to receive signals from a zero voltage detector, the timer circuit being operable to control frequency of oscillation in the self-resonant converter based on the signals from the self-resonant converter and the zero voltage detector.

13. The inverter circuit, as set forth in claim 12, wherein the self-resonant converter further comprises:

a first secondary transformer winding having a first terminal coupled to one end of the fluorescent lamp;

a second secondary transformer winding having a first terminal coupled to another end of the fluorescent lamp;

a first sense resistor coupled between the first secondary transformer winding and the second secondary transformer winding; and a rectifier coupled to receive a signal indicative of the current at an end of the fluorescent lamp.

14. The inverter circuit, as set forth in claim 13, further comprising:

a second sense resistor coupled between one terminal of the first sense resistor and another terminal of the second secondary transformer winding, wherein the rectifier includes:

a first switch having one terminal coupled between the first sense resistor and the first secondary transformer winding;

a second switch having one terminal coupled between the second sense resistor and the second secondary transformer winding; and a ground reference resistor having one terminal coupled to ground between the first sense resistor and the second sense resistor, the other terminal of the ground reference resistor coupled to another terminal of the first switch and another terminal of the second switch.

15. An inverter circuit for providing a drive signal to operate a fluorescent lamp, the inverter circuit comprising:

a pulse width modulator coupled to receive a reference signal and a feedback signal indicative of current in the fluorescent lamp, the pulse width modulator being operable to generate driving signals;

a synchronously switching voltage regulator having a high side driver and a low side driver coupled to receive the driving signals from the pulse width modulator;

a self-resonant converter coupled to the fluorescent lamp, the self-resonant converter being operable to receive an input voltage signal and to generate another voltage signal for illuminating the fluorescent lamp; and a timer circuit coupled to transmit and receive signals from a self-resonant converter and to receive signals from a zero voltage detector, the timer circuit being operable to control frequency of oscillation in the self-resonant converter based on the signals from the self-resonant converter and the zero voltage detector.

16. The inverter circuit, as set forth in claim 15, wherein the self-resonant converter includes:

a transformer having a primary winding and at least one secondary winding;

a capacitor coupled in parallel with the primary winding; and a bridge circuit having four switching transistors coupled in an H-configuration to the primary winding and the capacitor.

17. The inverter circuit, as set forth in claim 16, wherein the switching transistors comprise field effect transistors.

18. The inverter circuit, as set forth in claim 15, wherein the zero voltage detector is coupled to control switching of the synchronously switching voltage regulator based on voltage input to the self-resonant converter.

19. The inverter circuit, as set forth in claim 15, further comprising an over voltage monitor and a control circuit coupled to receive signals from the self-resonant converter and to transmit signals to the pulse width modulator.

20. The inverter circuit, as set forth in claim 19, wherein a first terminal of the at least one secondary transformer winding is coupled to one end of the fluorescent lamp, a second terminal of the at least one secondary transformer winding is coupled to ground, and another end of the fluorescent lamp is coupled to a rectifier, the rectifier being coupled to receive a signal indicative of the current at an end of the fluorescent lamp.

21. A method of generating voltage signals for illuminating a fluorescent lamp using a dual converter circuit, wherein the dual converter circuit includes a synchronously switching voltage regulator coupled to a self-resonant converter, and a pulse width modulator coupled to receive a reference signal and a feedback signal indicative of current in the fluorescent lamp, the method comprising:

generating drive signals with the pulse width modulator, the drive signals being based on the reference signal and the feedback signal;

inputting the drive signals to the switching voltage regulator to control operation of the switching voltage regulator;

generating a first voltage signal based on the drive signals;

inputting the first voltage signal to the self-resonant converter;

generating a second voltage signal based on the first voltage;

inputting the second voltage to the fluorescent lamp; and coupling a timer circuit to transmit and receive signals from the self-resonant converter and to receive signals from a zero voltage detector; and controlling the frequency of oscillation in the self-resonant converter based on the signals from the self-resonant converter and the zero voltage detector.

22. The method, as set forth in claim 21, wherein the self-resonant converter includes a transformer having a primary winding and at least one secondary winding and a capacitor coupled in parallel with the primary winding, the method further comprising:

coupling a bridge circuit having four switching transistors in an H-configuration to the primary winding and the capacitor; and controlling operation of the self-resonant converter using the bridge circuit.

23. The method, as set forth in claim 22, wherein the switching transistors comprise field effect transistors.

24. The method, as set forth in claim 21, further comprising coupling a zero voltage detector to control switching of the synchronously switching voltage regulator based on voltage input to the self-resonant converter.

25. The method, as set forth in claim 21, further comprising coupling an over voltage monitor and a control circuit to receive signals from the self-resonant converter and to transmit signals to the pulse width modulator.

26. The method, as set forth in claim 21, wherein the self-resonant converter includes a transformer having a primary side with a primary transformer winding, and a secondary side with a first secondary transformer winding and a second secondary transformer winding, the method comprising:

(a) coupling a first terminal of the first secondary transformer winding to one end of the fluorescent lamp;

(b) coupling a first terminal of the second secondary transformer winding to another end of the fluorescent lamp; and (c) coupling a first sense resistor between the first secondary transformer winding and the second secondary transformer winding;

(d) coupling a rectifier to the secondary side of the transformer to generate the feedback signal;

(e) driving the first secondary transformer winding with a first AC drive signal;

(f) driving the second secondary transformer winding with a second AC drive signal that is out of phase with the first AC drive signal; and (g) generating a feedback signal indicative of current through at least one end of the fluorescent lamp.

* * * * *